May 6, 1958   J. T. GATES   2,833,157
BALL RETAINER FOR BALL SCREWS
Filed Dec. 22, 1954   2 Sheets-Sheet 1

*INVENTOR.*
JAMES T. GATES
BY
*ATTORNEY*

United States Patent Office 2,833,157
Patented May 6, 1958

2,833,157

BALL RETAINER FOR BALL SCREWS

James T. Gates, Cleveland Heights, Ohio, assignor to The Cleveland Pneumatic Tool Company, Cleveland, Ohio, a corporation of Ohio Application December 22, 1954, Serial No. 477,008

12 Claims. (Cl. 74—459)

This invention relates generally to a ball screw device and more particularly to means for retaining the balls within the grooves in the nut or screw of such a device and is an improvement of the retainer disclosed in the copending application of Walter H. Hogan, Serial No. 454,556 filed September 7, 1954.

In the conventional ball screw device, complementary grooves are formed in both the nut and the screw which cooperate to define a ball channel which is filled with antifriction ball bearings. Return means are also provided to convey the balls between the ends of the ball channel to form a continuous closed circuit of balls. In the copending application cited above, a retainer is disclosed for securing the balls within the grooves of either the nut or the screw indepenednt of the cooperating element so that the screw and nut may be disassembled and reassembled without repacking the balls.

A ball retainer according to this invention is particularly adapted for use in a ball screw of the type disclosed in the copending application of Leonard P. Spontelli, Serial No. 451,333 filed August 23, 1954, and reference should be made to that application for a detailed description of the ball screw mechanism per se.

It is an important object of this invention to provide a ball screw device wherein means are provided within the nut or screw to retain the balls within the grooves of either the nut or screw.

It is another object of this invention to provide a new and improved ball retainer for use in a ball screw mechanism which permits the removal of the screw from the nut without necessitating repacking of the balls during reassembly.

It is still another object of this invention to provide a ball screw or nut incorporating a helical ball retaining member which is supported throughout its entire length.

Further objects and advantages will appear from the following description and drawings, wherein.

Figure 1:
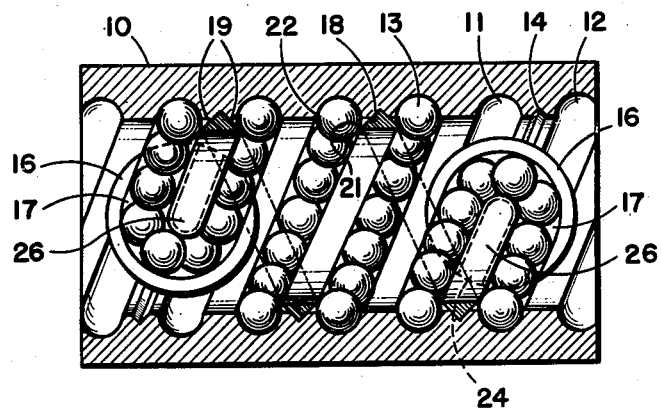
Figure 1 is a side elevation in longitudinal cross section showing a nut provided with a retainer for retaining the balls in the groove of the nut.

By utilizing a ball screw mechanism according to this invention, it is possible to load the balls within the grooves of the nut or screw without the presence of the other element. In Figure 1 a nut assembly is disclosed illustrating the fact that the balls will be retained in the nut without the presence of the screw. Referring to the drawings, a nut 10 is formed with two helical grooves 11 and 12 having the same lead adapted to receive balls 13. The nut 10 is also formed with a V-shaped helical furrow 14 which is equally spaced from both of the grooves 11 and 12. The two ball re-circulating inserts 16, each formed with a semi-circular U-shaped groove 17, are mounted in the nut 10 with one end of each U-shaped groove 17 aligned with each of the grooves 11 and 12. By utilizing this structure including the grooves 11 and 12 and the U-shaped grooves 17, a closed circuit is provided which is adapted to receive the balls 13 so that a continuous line of balls is formed within the nut 10. A helical retainer 18 having a substantially triangular cross section is positioned within the furrow 14 and is provided with side walls 19 engaging the balls 13 and retaining them within the grooves 11 and 12. The proportions of the grooves 11 and 12, the balls 13 and the retainer 18 should be arranged so that a point of contact 21 between the retainer 18 and each ball 13 cooperates with a point of engagement 22 between each ball and the edge of the grooves 11 and 12 to retain the balls in the grooves.

Figure 4:
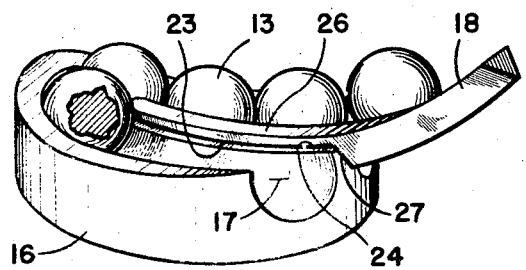
Figure 4 is an enlarged fragmentary perspective view showing the cooperation between the retainer and the re-circulating insert.

Each end of the retainer 18 is provided with a flat 23 which is proportioned to extend along a central ridge 24 defined by the U-shaped groove 17 on the inserts 16 as shown in Figure 4. This provides an end portion 26 which cooperates with the U-shaped groove 17 and retains the balls within the groove 17 as illustrated in Figures 1 and 4. Substantially radial walls 27, adjacent to the end of each of the flats 23, engage the end of each central ridge 24 and prevent the retainer from being threaded along the furrow 14.

Figure 2:
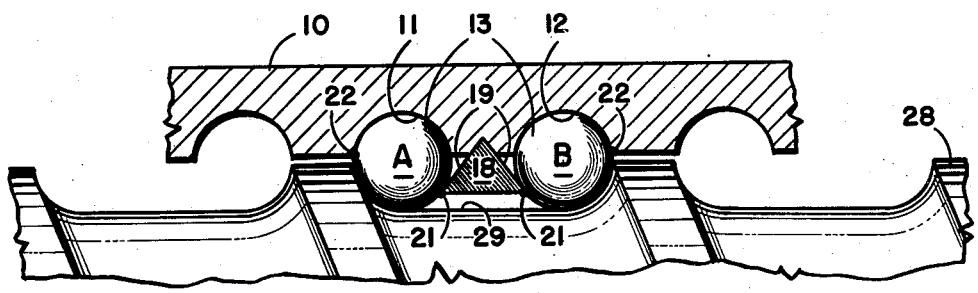
Figure 2 is a fragmentary side elevation partially in longitudinal section showing a ball screw and nut incorporating this invention illustrating the cooperation between the nut, retainer and screw.
Figure 3:
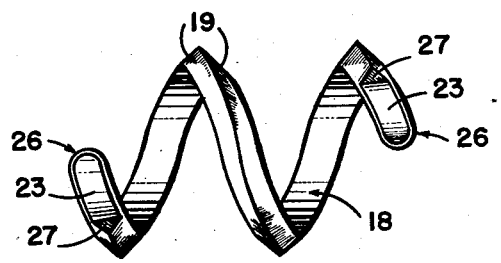
Figure 3 is a side elevation of a ball retainer shown in Figures 1 and 2.

Figure 2 discloses how a nut of the type shown in Figure 1 cooperates with a screw 28 to provide an antifriction ball screw mechanism. The screw 28 is provided with a broad helical groove 29 having the same lead as the grooves 11 and 12 and a width proportioned to encompass both of the grooves 11 and 12. As clearly illustrated, the retainer 18 will not interfere with the operation of the screw since a substantial clearance is provided between the surface of the screw and the retainer.

In operation the balls 13 within the groove 11 define a first helical pass of balls A and the balls within the groove 12 define a second helical pass of balls B. When the screw 28 is loaded axially with a force that tends to move the screw to the left as shown in Figure 2, the pass B serves as the load bearing pass and the pass A serves as the return pass. Again when the screw 28 is loaded with an axial force to the right as shown in Figure 2, the pass A serves as the load carrying pass and the pass B serves as the return pass. For a more detailed description of this type of ball screw mechanism, reference should be made to the Spontelli application cited above.

The retainer according to this invention is preferably formed of metal or suitable plastics and should be proportioned so that its unstressed diameter is slightly greater than the diameter it assumes in the nut so that a positive force will always be present urging the retainer 18 outwardly into the furrow 14. By utilizing this structure, a retainer is provided which is well supported throughout its entire length. The loading of the balls within the nut can easily be achieved since the ends of the retainer can be moved radially inward away from the grooves during the loading to facilitate placement of the balls within the grooves.

Figure 5:
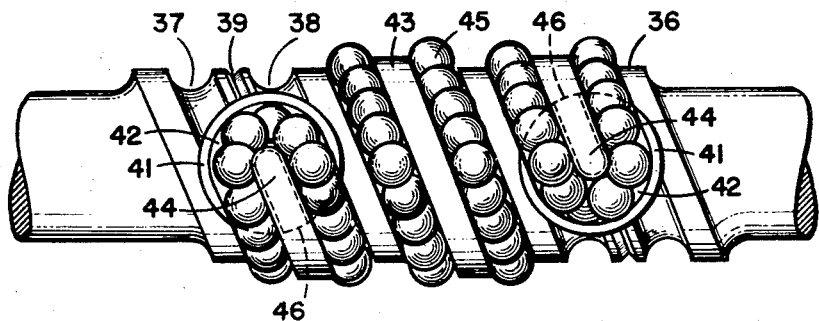
Figure 5 is a side elevation of a ball screw provided with a retainer for retaining the balls in the grooves of the screw.
Figure 6:
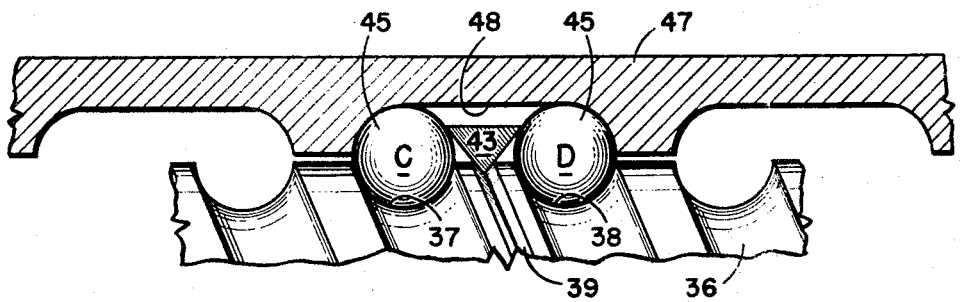
Figure 6 is a fragmentary side elevation partially in longitudinal section showing the cooperation between the ball screw, nut and retaining means of the embodiment shown in Figure 5.

In the embodiment shown in Figures 5 and 6 a similar structure is utilized but in this case the retainer is mounted on the screw. The screw 36 is provided with two helical grooves 37 and 38 and a helical V-shaped furrow 39 between the grooves. A re-circulating insert 41 is mounted in each end of the screw 36 and provided with a U-shaped groove 42 adapted to connect the grooves 37 and 38. A helical retainer 43 having a triangular cross section is positioned in the furrow 39 and is formed with end portions 44 adapted to fit over a central ridge 46 of each insert in a manner similar to the embodiment shown in Figures 1 through 4. Here again the grooves 37 and 38 and the retainer 43 are arranged to provide points of engagement with each ball 45 arranged so as to maintain the balls within the grooves. In this case the retainer 43 should be made with an unstressed diameter less than the diameter it must assume when it is in the furrow 39 to provide a secure rigid mounting of the retainer 43 on the screw 36.

Figure 6 discloses the screw 36 in cooperation with a nut 47 which is provided with a helical groove 48 having the same lead as the grooves 37 and 38 and a width broad enough to encompass both of these grooves. The balls within the groove 37 form a pass C and the balls within the groove 38 form a pass D which cooperate depending upon the loading of the screw to serve as either the load carrying balls or the return balls.

Both of the retainer embodiments shown cooperate with either the nut or the screw depending upon which element the retainer is mounted on to define ball channels wherein the balls are firmly retained when the cooperating element is removed.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a device of the character described, a body member formed with a helical groove, a plurality of balls positioned within said groove, and retaining means outside of but parallel to said groove supported by and in engagement with said body substantially throughout its entire length engaging said balls and retaining them in said groove.

2. In a device of the character described, a body member formed with a helical groove and a helical furrow parallel to said groove, balls in said groove, and a helical retainer positioned in said furrow engaging said balls at a point spaced from said furrow cooperating with the walls of said groove to loosely retain the balls in said groove.

3. In a device of the character described, a body member formed with a helical groove and a helical furrow parallel to said groove, balls in said groove, and a helical retainer positioned in said furrow provided with a helical edge engaging said balls at a point spaced from said groove cooperating with the walls of said groove to retain the balls in said groove.

4. In a device of the character described, a body member formed with a helical groove and a helical V-shaped furrow parallel to said groove, balls in said groove, and a helical retainer having a triangular cross section positioned in said furrow engaging said balls at a point spaced from said groove cooperating with the walls of said groove to retain the balls in said groove.

5. In a device of the character described, a body member formed with a helical groove and a helical furrow parallel to said groove, balls in said groove, and a helical retainer positioned in said furrow engaging said balls at a point spaced from said furrow cooperating with the walls of said groove to loosely retain the balls in said groove, said retainer being deflected from its unstressed position by the walls of said furrow so that substantially the entire length of said retainer is in tight engagement with said furrow walls and thereby supported throughout substantially its entire length.

6. In combination, a body member formed with a helical groove and a helical furrow, balls in said groove, a helical retainer positioned in said furrow engaging said balls at a point spaced from said furrow cooperating with the walls of said groove to loosely retain the balls in said groove, and a cooperating member formed with a helical groove having the same lead as said body member groove engaging said balls whereby relative rotation between said members produces axial motion therebetween.

7. In a device of the character described, a body member formed with two coaxial similar helical grooves and a helical furrow between said grooves, the axial spacing between both of said grooves and said furrow being equal and constant throughout the length thereof, transfer means connecting adjacent ends of said helical grooves and in cooperation with said grooves defining a closed ball channel, balls filling said channel, and a helical retaining member positioned in said furrow proportioned to engage said balls and retain them in said grooves.

8. In a device of the character described, a body member formed with two coaxial similar helical grooves and a helical furrow between said grooves, the axial spacing between both of said grooves and said furrow being equal and constant throughout the length thereof, transfer means formed with a re-circulating groove connecting adjacent ends of said helical grooves and in cooperation with said grooves defining a closed ball channel, balls filling said channel, a helical retaining member positioned in said furrow proportioned to engage all of said balls and retain them in said grooves.

9. In combination, a body member formed with two coaxial similar helical grooves and a helical furrow between said grooves, the axial spacing between both of said grooves and said furrow being equal and constant throughout the length thereof, transfer means formed with a re-circulating groove connecting adjacent ends of said helical grooves and in cooperation with said grooves defining a closed ball channel, balls filling said channel, and a helical retaining member positioned in said furrow proportioned to engage all of said balls and retain them in said grooves, and a cooperating member formed with a groove having the same lead as body member grooves engaging said balls whereby relative rotation between said members produces axial motion therebetween.

10. In combination, a body member formed with two coaxial similar helical grooves and a helical furrow between said grooves, the axial spacing between both of said grooves and said furrow being equal and constant throughout the length thereof, transfer means formed with a re-circulating groove connecting adjacent ends of said helical grooves and in cooperation with said grooves defining a closed ball channel, balls filling said channel, and a helical retaining member positioned in said furrow proportioned to engage all of said balls and retain them in said groove, and a cooperating member formed with a groove of a width sufficiently wide to encompass both of said body member grooves engaging said balls whereby relative rotation between said members produces axial motion therebetween.

11. In a device of the character described, a body member formed with two coaxial similar helical grooves and a helical furrow between said grooves, the axial spacing between both of said grooves and said furrow being equal and constant throughout the length thereof, transfer means formed with a U-shaped semi-circular groove connecting adjacent ends of said helical grooves and in cooperation with said grooves defining a closed ball channel, balls filling said channel, and a helical retaining member positioned in said furrow proportioned to engage all of said balls and retain them in said grooves, said retainer being deflected from its unstressed position by the walls of said furrow so that substantially the entire length of said retainer is in tight engagement with said furrow walls and thereby supported substantially throughout its entire length.

12. In a device of the character described, a body member formed with two coaxial similar helical grooves and a helical furrow between said grooves, the axial spacing between both of said grooves and said furrow being equal and constant throughout the length thereof, transfer means formed with a U-shaped semi-circular groove connecting adjacent ends of said helical grooves and in cooperation with said grooves defining a closed ball channel, balls filling said channel, and a helical retaining member having a central portion positioned in said furrow proportioned to engage said balls in said helical grooves and retain them therein and end portions extending along said U-shaped groove proportioned to engage the balls in said U-shaped grooves and retain them therein.

References Cited in the file of this patent

UNITED STATES PATENTS

| | | |
|---|---|---|
| 2,618,166 | Douglas | Nov. 18, 1952 |
| 2,634,624 | Burt | Apr. 14, 1953 |

FOREIGN PATENTS

| | | |
|---|---|---|
| 17,877 | Great Britain | Aug. 5, 1911 |
| 366,658 | Germany | Jan. 9, 1923 |